United States Patent [19]

Fujikawa

[11] Patent Number: 4,646,492

[45] Date of Patent: Mar. 3, 1987

[54] WINDOW GLASS MOUNTING ON A MOTOR VEHICLE

[75] Inventor: Yoshihiro Fujikawa, Toyota, Japan

[73] Assignee: Toyota Jidosha Kabushiki Kaisha, Japan

[21] Appl. No.: 680,784

[22] Filed: Dec. 12, 1984

[30] Foreign Application Priority Data

Dec. 14, 1983 [JP] Japan .......................... 58-192645[U]

[51] Int. Cl.$^4$ ............................................. E06B 3/00
[52] U.S. Cl. ...................................... 52/208; 52/489; 296/84 R
[58] Field of Search ................. 52/208, 204, 489, 397, 52/400; 296/84 R, 84 D, 93

[56] References Cited

U.S. PATENT DOCUMENTS 3,274,740 9/1966 Hall ...................................... 52/208
4,072,340 2/1978 Morgan .............................. 52/208 X

FOREIGN PATENT DOCUMENTS 276345 7/1951 Switzerland .......................... 52/208
952029 3/1964 United Kingdom .................. 52/208

Primary Examiner—Carl D. Friedman
Assistant Examiner—Naoko N. Slack

Attorney, Agent, or Firm—Finnegan, Henderson, Farabow, Garrett & Dunner

[57] ABSTRACT

A window glass in a motor vehicle having fixed mouldings covering an outer peripheral end edge of the window glass. The fixed mouldings are solidly secured to the window glass along the bottom side and one of the vertical sides of the window glass. A plurality of retainers are arranged at suitable intervals along the fixed mouldings on the inner side of the outer peripheral end edge of the window glass and fixed to a window frame. A plurality of clip assemblies are coupled to the window frame from the outside at suitable intervals at positions adjacent the outer surface of the outer peripheral end edge of the window glass. The clip assemblies press the outer peripheral end edge of a top side of the window glass and one of the vertical sides of the window glass. Moulding covers the clip assemblies, the outer peripheral end edge of the top side of the window glass, and one of the vertical sides of the window glass, and is secured to the clip assemblies from the outside. The retainers for the fixed mouldings are secured to the moulding with locking bolts. The retainers are extended through the window frame and into the vehicle body. The protruded end portions are threadably coupled to nuts, so that the retainers can be tightened and fixed to the window frame.

16 Claims, 15 Drawing Figures

WINDOW GLASS MOUNTING ON A MOTOR VEHICLE

BACKGROUND OF THE INVENTION

1. Field of the Invention

This invention relates to improvements in a construction for mounting a window glass in a motor vehicle.

2. Description of the Prior Art

As has been seen in many publications for examples as Japanese Utility Models Laid Open Nos. 58-35,416, 56-27,110, 57-76,122, 55-37,705, 58-54,315, 58-135,310, 57-141,113, 56-136,811 and 56-106,109 there has been proposed a construction for mounting a window glass in a motor vehicle. Further, as shown in FIGS. 11 to 15, as the conventional construction for mounting a window glass in a motor vehicle, there has been one having a moulding 8 covering the outer surface of a clip assembly 10 comprising: a body's side clip 4 on the vehicle, solidly secured to the vehicle body 3 at a position adjacent an outer peripheral end edge 2A of a window glass 2 in a motor vehicle 1; a screw 5 threadably coupled to the body's side clip 4; a clip body 6 tightened and fixed to the body's side clip 4 by means of the screw 5 and having a forward end portion 6A for pressing the outer peripheral end edge 2A of the window glass 2; and a retainer 7 tightened and fixed together with the clip body 6 to the body's side clip 4 by means of the screw 5 from the outside of the clip body 6.

Referring to the drawing, designated at 9 is a sealer interposed between the inner surface of the outer peripheral end edge 2A of the window glass 2 and the vehicle body 3, for sealing a space formed therebetween, 11 a hole formed in the vehicle body 3, into which the body's side clip 4 is coupled, 12 a seal interposed between the clip body 6 and the vehicle body 3 around the hole 11, for sealing a space formed therebetween and preventing water leakage through the hole 11, and 13 a seal secured to an end portion of the moulding 8, for contacting the outer surface of the window glass 2 to seal a space formed therebetween.

In FIG. 13, designated at 14 is a stopper disposed between the clip assemblies 10 and solidly secured to the vehicle 3, for pressing the outer peripheral end edge 2A of the window glass 2 to prevent the window glass 2 from moving.

In the conventional construction for mounting a window glass in a motor vehicle as described above, since the clip body 6 substantially presses the outer peripheral end edge of the window glass 2 through the forward end portion 6A thereof, a considerably high mechanical strength is required from the forward end portion 6A, and hence, the forward end portion 6A is formed to have a considerable thickness meeting the requirement of this mechanical strength.

Furthermore, the moulding 8 is engaged with projections 6B and 6C projecting from the right and left end portions of the clip body 6 as shown in the drawing and adapted to cover the outer surface of the clip assembly 10.

In consequence, a thickness of this moulding 8 measured from the surface of the window glass 2, i.e. a difference in stage H should have a height necessary for covering a sum of a thickness of the forward end portion 6A of the clip body 6 from the surface of the window glass 2, a thickness of the retainer 7 and a thickness of a head 5A of the screw 5.

When irregularities on the outer surface of the motor vehicle are minimized, i.e. the flush surface is adopted so as to reduce the air resistance during running of the motor vehicle at high speed, the difference in stage H has been disadvantageous in that it serves as one of causes of increasing the air resistance.

Furthermore, in the construction for mounting a window glass in a motor vehicle as described above, since the positional relationship of the clip assembly 10 with the window glass 2 is determined by deflecting the clip assembly to absorb a variability of window glass in the external dimensions thereof, such a disadvantage has been presented that the workability is low when the window glass 2 is assembled into the vehicle body 2.

Further, since the clip assembly 10 is secured to the window glass 2 in a manner to be deflected to a certain extent as described above, the pressure-sensitive form sealer 9 secured to the window glass 2 is subjected to a force acting on along the surface of the window glass 2 to be deformed, such a disadvantage has been presented that the sealing between the window glass 2 and the vehicle body 3 becomes unstable.

SUMMARY OF THE INVENTION

It is therefore the primary object of the present invention to provide a construction for mounting a window glass in a motor vehicle, wherein a value of a moulding protruding from the surface of the window glass is decreased, so that the air resistance to the motor vehicle during running at high speed can be reduced.

Another object of the present invention is to provide a construction for mounting a window glass in a motor vehicle, wherein a variability in the external dimensions and a variability in assembling of the window glass can be absorbed without requiring the deformation of a clip assemblies and the like.

A further object of the present invention is to provide a construction for mounting a window glass in a motor vehicle, wherein an instability in the sealing between the window glass and the vehicle body due to a deformation of a sealing member is reduced.

To the above end, the present invention contemplates that a construction for mounting a window glass in a motor vehicle comprises: fixed mouldings covering an outer peripheral end edge of the window glass and solidly secured thereto along the bottom side and one of the vertical sides in the longitudinal direction of the vehicle of the window glass; a plurality of retainers arranged at suitable intervals along the fixed mouldings on the inner side of the outer peripheral end edge of the window glass, integrally fixed thereto and tightened and fixed to a window frame; a plurality of clip assemblies coupled to the window frame from the outside at suitable intervals at positions adjacent the outer surfaces of the outer peripheral end edges of the top side and the other of the vertical sides of the window glass and pressing the outer peripheral end edges of the top side and the other of the vertical sides of the window glass in the coupled state; and a moulding covering the clip assemblies, the outer peripheral end edges of the top side and the other of the vertical sides of the window glass, and secured to the clip assemblies from the outside.

Further, to the above end, the present invention contemplates that the clip assemblies each comprises a body's side clip, solidly secured to the vehicle body at a position adjacent the outer peripheral end edge of the window glass, a screw threadably coupled to the body's side clip, a clip body tightened and fixed to the body's side clip by means of the screw and having a forward end portion pressing the outer peripheral end edge of the window glass and retainers tightened and fixed together with the clip body to the body's side clip from the outside of the clip body by means of the screw, and the forward end portion of the clip body is formed into one of a thin wall thickness, and the forward end portion of the retainer is brought into contact with the outer surface of the forward end portion of the thin wall thickness of the clip body and extended, projecting to the center of the window glass farther than the forward end portion of the clip body, whereby the window glass is pressed by means of the forward end portion of the retainer, the moulding can be secured to the forward end portion of the retainer, and end faces of the clip body and the retainer, which are to be tightened by means of said screw are offset inwardly into the vehicle body with respect to the forward end portions of the clip body and the retainer.

To the above end, the present invention contemplates that said fixed mouldings are bonded and fixed to the outer peripheral end edges in a manner to embrace the outer peripheral end edges of the window glass, respectively, and the retainers are integrally fixed to the fixed mouldings respectively.

To the above end, the present invention contemplates that said retainers are previously secured thereto with locking bolts, which are extended through the window frame and protruded into the vehicle body, respectively, and the pretruded end portions are threadably coupled to nuts, so that the retainers can be tightened and fixed to the window frame.

To the above end, the present invention contemplates that in a state where the locking bolt of the retainer mounted to one side of the window glass is inserted through an insertion hole previously formed in the window frame, the window glass can be rotated about the locking bolt, while being in contact with the window frame.

To the above end, the present invention contemplates that at least another side opposed to said one side of the window glass is fixed to the window frame by the clip assemblies.

DETAILED DESCRIPTION OF THE PREFERRED EMBODIMENT

Figure 1:
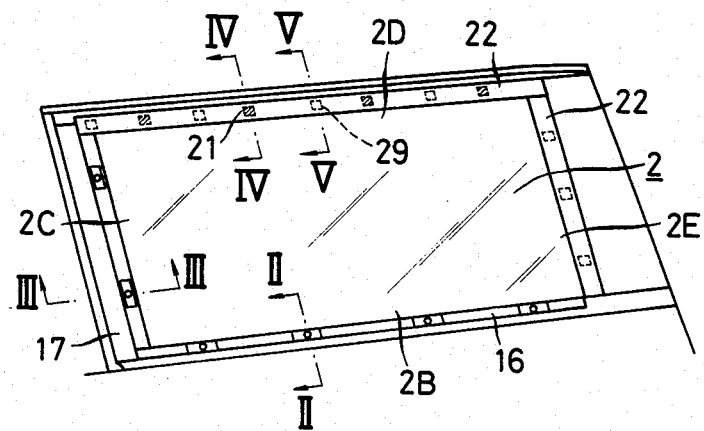
FIG. 1 is a perspective view showing one embodiment of the construction for mounting a window glass in a motor vehicle according to the present invention.

Description will hereunder be given of one embodiment of the present invention with reference to the drawings. In this embodiment, same reference characters in FIGS. 11 to 15 are used to designate same or similar parts corresponding to ones in the conventional construction for mounting a window glass in a motor vehicle as shown in FIGS. 11 to 15, so that the detailed description need not be repeated.

As shown in FIGS. 1 to 5, according to this embodiment, a construction for mounting a window glass in a motor vehicle, comprises: fixed mouldings 16 and 17 covering an outer peripheral end edge 2A of the window glass 2 and solidly secured thereto along the bottom side 2B and a front one 2C of the vertical sides in the longitudinal direction of the vehicle of the window glass 2; a plurality of retainers 19 and 20 arranged at suitable intervals along the fixed mouldings 16 and 17 on the inner side of the peripheral end edge 2A, integrally fixed thereto and tightened and fixed to a window frame 18 on the vehicle body 3; a plurality of clip assemblies 21 coupled to the window frame 18 from the outside at suitable intervals at positions adjacent the outer surface of the outer peripheral end edge 2A of the top side 2D and a rear one 2E of the vertical sides of the window glass 2 and pressing the outer peripheral end edge 2A of the top side 2D and the rear one 2E of the vertical sides of the window glass 2 in the coupled state; and a moulding 22 covering the clip assemblies 21, the outer peripheral end edges 2A of the top side 2D and the rear one 2E of the vertical sides of the window glass 2, and secured to the clip assemblies 21 from the outside.

Figure 2:
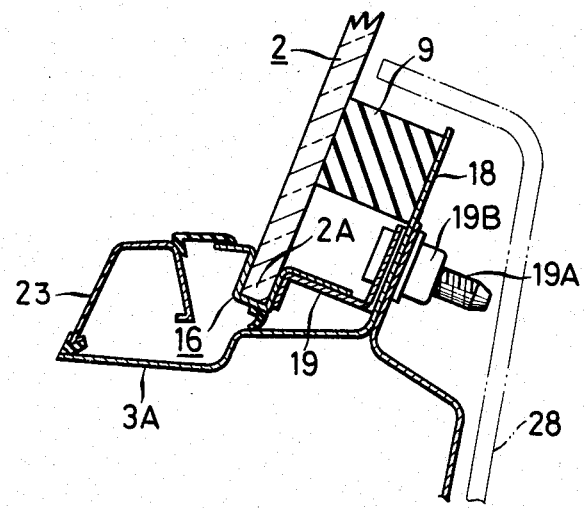
FIGS. 2 to 5 are enlarged sectional views taken along the lines II—II to V—V in FIG. 1.
Figure 3:
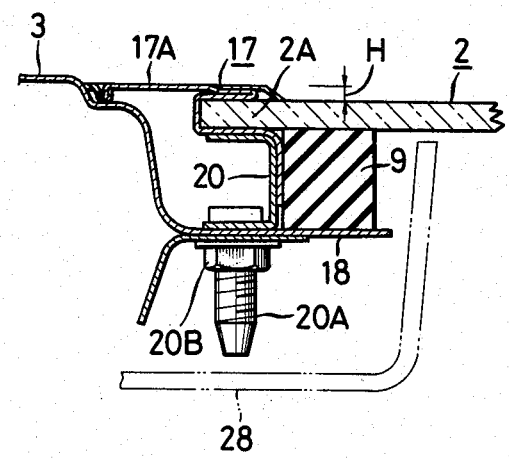
Figure 4:
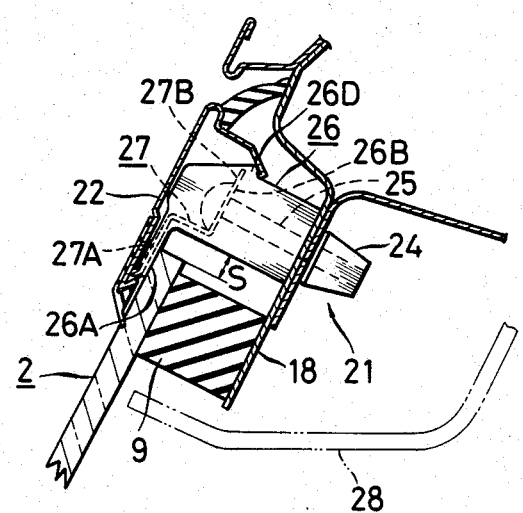
Figure 5:
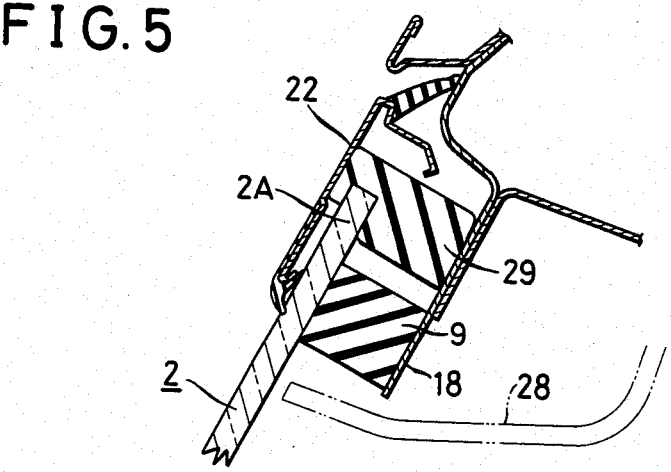

As shown in FIGS. 2 and 3, respectively, the fixed mouldings 16 and 17 are bonded and fixed to the outer peripheral end edges 2A in a manner to embrace the outer peripheral end edges 2A of the window glass 2, respectively, and the retainers 19 and 20 are integrally welded to the fixed mouldings 16 and 17, respectively.

Figure 6:
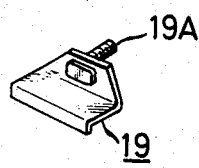
FIGS. 6 and 7 are perspective views showing the retainer in the above embodiment.
Figure 7:
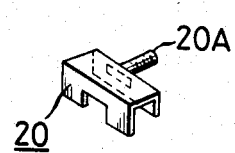
Figure 8:
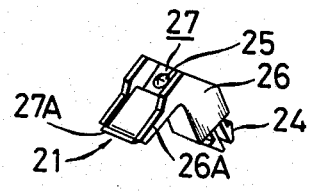
FIG. 8 is a perspective view showing the clip assembly in the above embodiment.
Figure 9:
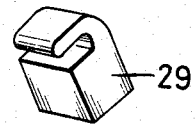
FIG. 9 is a perspective view showing the stopper in the above embodiment.

Further, as shown in FIGS. 6 and 7, respectively, the retainers 19 and 20 are previously secured thereto with locking bolts 19A and 20A, which are extended through the window frame 18 and protruded into the vehicle body, respectively, and the protruded end portions are threadably coupled to nuts 19B and 20B, so that the retainers 19 and 20 can be tightened and fixed to the window frame 18.

Herein, the outer surface 17A of the fixed moulding 17 covering the front one 2C of the vertical sides of the window glass 2 is in parallel to and substantially flush with the outer surfaces of the window glass 2 and the body 3.

Furthermore, the moulding 16 covering the bottom side 2B of the window glass 2 is formed such that the outer end portion thereof is connected to a moulding 23 covering a corner portion formed by a belt line 3A on the vehicle body's side and the window glass 2.

Each of the clip assemblies 21 pressing the outer peripheral end edges 2A in the top side 2D and the rear one 2E of the window glass 2 comprises: a body's side clip 24, solidly secured to the vehicle body 3 at a position adjacent the outer peripheral end edge 2A of the window glass 2; a screw 25 threadably coupled to this body's side clip 24; a clip body 26 tightened and fixed to the body's side clip 24 by means of the screw 25 and having a forward end portion 26A pressing the outer peripheral end edge 2A of the window glass 2; and a retainer 27 tightened and fixed together with the clip body 26 to the body's side clip 24 from the outside of the clip body 26 by means of the screw 25; and the forward end portion 26A of the clip body 26 is formed into one of a thin wall thickness, and the forward end portion 27A of the retainer 27 is brought into contact with the outer surface of the forward end portion 26A of the thin wall thickness of the clip body 26 and extended, projecting to the center of the window glass 2 farther than the forward end portion 26A, whereby the window glass 2 is pressed by means of the forward end portion 27A of the retainer, the moulding can be secured to the forward end portion 27A of the retainer, and end faces 26B and 27B of the clip body 26 and the retainer 27 to be tightened by means of the screw 25 are offset inwardly into the vehicle body with respect to the forward end portions 26A and 27A of the clip body 26 and the retainer 27.

More specifically, the retainer 27 is bent into a substantially crank-shape from the tightened face 27B to the forward end portion 27B and the clip body 26 is formed into a substantially crank-shape from the tightened face 26B as being the top end face to the forward end portion 26A, whereby the both tightened faces 26B as being the top end face to the forward end portion 26A, whereby the both tightened faces 27B and 26B are offset inwardly into the vehicle body with respect to the outer surface of the window glass 2.

In accordance with the above, a height of a sum of the clip body 26, the body's side clip 24 and the screw 25 in a direction of the thickness of the window glass 2 is shortened by a value equal to an offset value of the crank in the retainer 27 and the clip body 26 as compared with the aforesaid height in the prior art.

The forward end portion 26A of the clip body 26 is formed with a recess for receiving the forward end portion 27A of the retainer 27, whereby the undersurface and both right and left end faces in the drawing of the forward end portion 27A of the retainer are surrounded by the forward end portion 26A of the clip body 26, so that these undersurface and end faces are prevented from directly contacting the outer surface of the window glass 2 and the retainer 27 is determined in a positional relationship with the clip body 26.

The moulding 22 is substantially in parallel at the outer surface thereof with the window glass 2, engaged at one end portion thereof with a projection 26D of the clip body 26, and engaged at the other end portion of a U-shape with the forward end portion 27A of the retainer 27, so as to cover the outer surface of the clip assembly 21.

Figure 10:
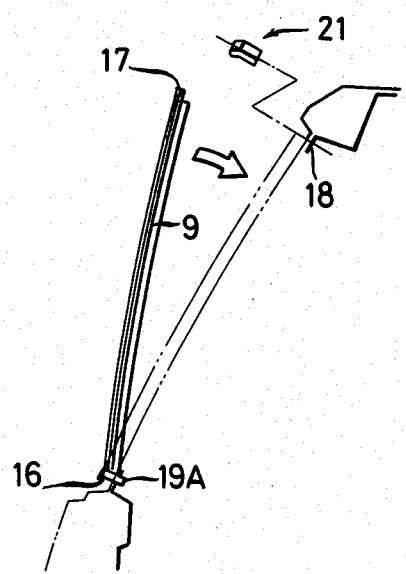
FIG. 10 a schematic sectional view showing the process of mounting the window glass according to the above embodiment.
Figure 11:
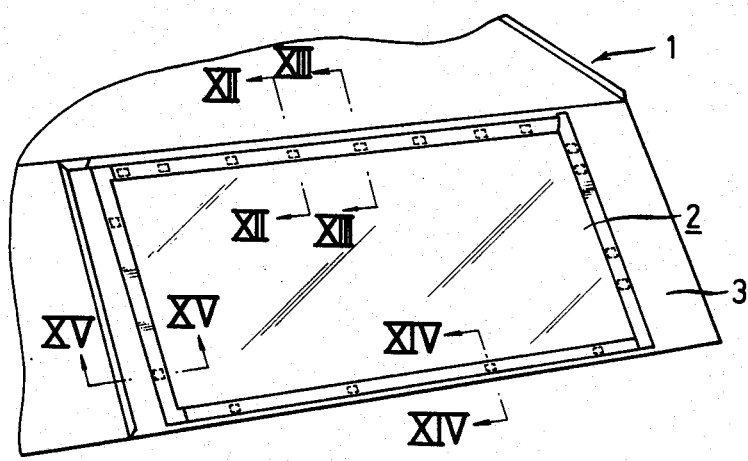
FIG. 11 is a perspective view showing the conventional construction for mounting a window glass in a motor vehicle.
Figure 12:
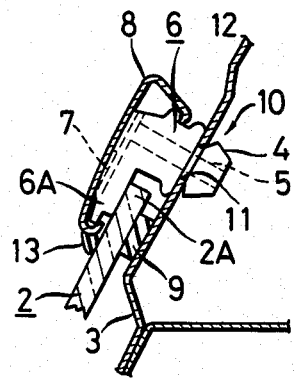
FIGS. 12 to 15 are enlarged sectional views taken along the lines XII—XII to XV—XV in FIG. 11.
Figure 13:
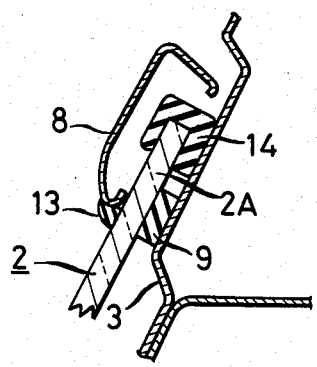
Figure 14:
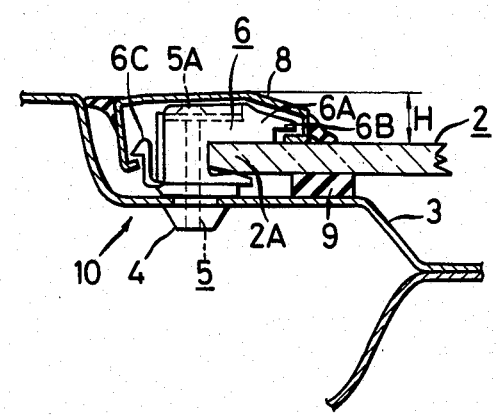

Referring to the drawings, designated at 28 is a garnish. In FIGS. 10 and 14, denoted at 29 are stoppers, a plurality of which are arranged between the clip assemblies 21, and the height of the stopper is so high as to come in contact with the inner surface of the moulding 22.

In consequence, the moulding 22 is supported by the stoppers 29 from the inside.

Description will hereunder be given of the working of mounting the window glass 2 to the window frame 18 by the construction for mounting the window glass.

Mounted in advance to the window glass 2 are the fixed mouldings 16, 17, the retainers 19, 20 and locking bolts 19A, 20A for the retainers and the pressure-sensitive form sealer 9.

Subsequently, in a state where the locking bolt 19A of the retainer 19 mounted to the bottom side 2B of the window glass 2 is inserted through an insertion hole previously formed in the window frame 18, the window glass 2 is rotated about the locking bolt 19A, while being in contact with the window frame 18 as shown in FIG. 10.

The nut 19B is threadably coupled onto the locking bolt 19A to tighten and fix the bottom side 2B in the state where the window glass 2 is placed on the window frame 18 as described above, and, during rotation of the window glass 2, the nut 20B is threadably coupled onto the locking bolt 20A, which is inserted through the window frame 18, of the retainer 20 mounted to the front vertical side 2C to tighten and fix the retainer 20.

Subsequently, the top side 2D and the rear vertical side 2E of the window glass 2 are fixed to the window frame 18 by the clip assemblies 21, and further, the moulding 22 is fixed thereonto, being engaged with the projections of the clip assemblies 21.

In conducting the working of mounting the window glass 2 as described above, the positional relationship of the bottom side 2B and the front vertical side 2C of the window glass 2 with the window frame 18 is determined by the fixed mouldings 16 and 17, whereby, when there are variabilities in the external dimensions of the window glass 2, the variabilities appear in the top side 2D and the rear vertical side 2E. However, since the clip assemblies 21 are mounted at the latter stage, the variabilities in the external dimensions can be absorbed by a space indicated by S in FIG. 4.

Figure 15:
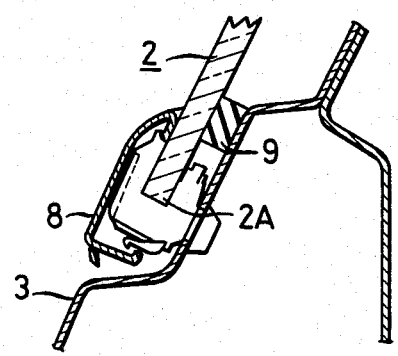

Furthermore, the pressure-sensitive form sealer 9 is mounted by rotating the window glass 2 as shown in FIG. 15, and subjected to a deforming force in the direction of the thickness of the glass window 2, i.e. in the perpendicular direction, whereby the pressure-sensitive form sealer 9 is not shifted along the surface of the window glass 2, so that the stabilized sealing effect can be obtained.

Further, in this embodiment, the bottom side 2B and the front vertical side 2C of the window glass 2 are supported by the fixed mouldings 16 and 17 which are bonded and fixed to the outer peripheral end edge 2A of the window glass 2, so that the difference in stage between the fixed mouldings 16, 17 and the outer surface of the window glass 2 can be reduced.

Furthermore, in this embodiment, the window glass 2 is rotated about the locking bolt 19A, placed on the window frame 18 and fixed by the clip assemblies 21 upon tightening the locking bolt 20A, so that the positioning is facilitated and the workability is improved.

Further, in this embodiment, the retainer 27 in the clip assembly 21 substantially presses the outer peripheral end edge 2A of the window glass 2 through the forward end portion 27A thereof, the forward end portion 26A of the clip body 26 is interposed between the forward end portion 27A of this retainer 27 and the outer surface of the outer peripheral end edge 2A of the window glass 2 to perform both functions of protecting the outer surface of the window glass 2 and of holding the retainer 27, and the retainer 27 presses the window glass 2 as aforesaid and additionally holds the moulding 22, whereby the forward end portion 26A of the clip body 26 suffices only if it is interposed between the forward end portion 27A of the retainer 27 and the window glass 2 to prevent the direct contact therebetween, so that the forward end portion 26A may be of a very thin one.

For this reason, the sum of the thicknesses of the forward end portion 26A of the clip body 26 and the forward end portion 27A of the retainer 27 can be made considerably small as compared with the case of the prior art.

Further, in this embodiment, in addition to making the forward end portion 26A of the clip body 26 thinner in its wall thickness, the tightened end faces 26B and 27B of the clip body 26 and the retainer 27 are offset inwardly into the vehicle body with respect to the forward end portions 26A and 27A, whereby a head 25A of the screw 25 for tightening and fixing the clip body 26 and the retainer 27 to the vehicle body does not protrude more outwardly from the forward end portion 27A of the retainer 27 as shown, so that the difference in stage H between the outer surfaces of the retainer 27 and the window glass 2 is determined by a sum of the thickness of the forward end portion 26A of the clip body 26, the thickness of the forward end portion 27A of the retainer 27 and the thickness of the moulding 22, thereby greatly reducing the difference in stage H as compared with the case of the conventional clip device for fixing the window glass as shown in FIG. 14.

Furthermore, in this embodiment, the outer peripheral end edge 2A of the window glass 2 is pressed by the retainer 27 generally formed of a metal material of a hgh rigidity such as steel, and the retainer 27 additionally holds the moulding 22, so that a sufficient strength of pressing the window glass and a sufficient strength of holding the moulding 22 can be obtained.

In the above embodiment, the fixed mouldings 16 and 17 are bonded and fixed to the outer peripheral end edges of the bottom side 2B and the front vertical side 2C of the window glass 2, respectively, however, the present invention need not necessarily be limited to this, and the mouldings may be secured to the bottom side 2B and the rear vertical side 2E.

What is claimed is:

1. A window glass mounting in a motor vehicle, the window glass having a bottom side, a top side, and a pair of substantially vertical sides, the window glass mounting comprising:
    fixed mouldings covering an outer peripheral end edge of the window glass and solidly secured thereto along the bottom side and one of the vertical sides of the window glass, the window glass having and inner side facing the interior of the vehicle and an outer surface;
    a plurality of retainers arranged at suitable intervals along said fixed mouldings on the inner side of the outer peripheral end edge of the window glass, said plurality of retainers being integrally fixed to said fixed mouldings, and also being tightened and fixed to a window frame;
    a plurality of clip assemblies coupled to the window frame from the outside at suitable intervals at positions adjacent the outer surface of the outer peripheral end edge of the top side of the window glass and the remaining one of the vertical sides of the window glass, said plurality of clip assemblies pressing the outer peripheral end edge of the top side and the remaining one of vertical sides of the window glass in said coupled state;
    mouldings coverting said clip assemblies, the outer peripheral end edge of the top side of the window frame and the remaining one of the vertical sides of the window glass, said mouldings secured to the clip assemblies from the outside, wherein said retainers for the fixed mouldings are secured thereto with locking bolts, said locking bolts extending through the window frame and protruding into the vehicle body, the protruding end portions being threadably coupled to nuts, so that the retainers can be tightened and fixed to the window frame.

2. The window glass mounting in a motor vehicle as set forth in claim 1, wherein said clip assemblies comprises a side clip solidly secured to the vehicle body at a position adjacent the outer peripheral end edge of the window glass, a screw threadably coupled to said side clip, a clip body tightened and fixed to said side clip by said screw and having a forward end portion pressing the outer peripheral end edge of the window glass, wherein the plurality retainers are tightened and fixed together with said clip body to said side clip from the outside of said clip body by said screw; the forward end portion of said clip body having a thin wall thickness, and the forward end portion of said retainer is brought into contact with the outer surface of the forward end portion of the thin wall thickness of said clip body and extended, projecting to the center of the window glass farther than the forward end portion of said clip body, whereby said window glass is pressed by means of the forward end portion of said retainer, wherein said moulding is secured to the forward end portion of said retainer, and end faces of said clip body and said retainer, which are tightened by said screw and offset inwardly into said vehicle body with respect to the forward end portions of said clip body and said plurality of retainers.

3. The window glass mounting in a motor vehicle as set forth in claim 2, wherein said fixed mouldings are bonded and fixed to the outer peripheral end edges in a manner to embrace the outer peripheral end edges of the window glass, and wherein the plurality of retainers for the fixed mouldings are integrally fixed to the fixed mouldings.

4. The window glass mounting in a motor vehicle as set forth in claim 3, wherein the locking bolt of the retainer is mounted to one side of the window glass, said window frame having insertion means for receiving the locking bolt, so that the window glass can be rotated about the locking bolt, while being in contact with the window frame.

5. The window glass in a motor vehicle as set forth in claim 4, wherein at least another side opposed to said one side of the window glass is fixed to the window frame by the clip assemblies.

6. The window glass in a motor vehicle as set forth in claim 3, wherein at least another side opposed to said one side of the window glass is fixed to the window frame by the clip assemblies.

7. The window glass mounting in a motor vehicle as set forth in claim 2, wherein the locking bolt of the retainer is mounted to one side of the window glass, said window frame having insertion means for receiving the locking bolt, so that the window glass can be rotated about the locking bolt, while being in contact with the window frame.

8. The window glass in a motor vehicle as set forth in claim 7, wherein at least another side opposed to said one side of the window glass is fixed to the window frame by the clip assemblies.

9. The window glass mounting in a motor vehicle as set forth in claim 2, wherein at least another side opposed to said one side of the window glass is fixed to the window frame by the clip assemblies.

10. The window glass mounting in a motor vehicle as set forth in claim 1, wherein said fixed mouldings are bonded and fixed to the outer peripheral end edges in a manner to embrace the outer peripheral end edges of the window glass, and wherein the plurality of retainers for the fixed mouldings are integrally fixed to the mouldings.

11. A window glass mounting in a motor vehicle as set forth in claim 10, wherein the locking bolt of the retainer is mounted to one side of the window glass, so that the window glass can be rotated about the locking bolt, while being in contact with the window frame.

12. The window glass in a motor vehicle as set forth in claim 11, wherein at least another side opposed to said one side of the window glass is fixed to the window frame by the clip assemblies.

13. The window glass mounting in a motor vehicle as set forth in claim 10, wherein at least another side opposed to said one side of the window glass is fixed to the window frame by the clip assemblies.

14. The window glass mounting in a motor vehicle as set forth in claim 1, wherein the locking bolt of the retainer is mounted to one side of the window glass, said window frame having insertion means for receiving the locking bolt, so that the window glass can be rotated about the locking bolt, while being in contact with the window frame.

15. A window glass in a motor vehicle as set forth in claim 14, wherein at least another side opposed to said one side of the window glass is fixed to the window frame by the clip assemblies.

16. The window glass mounting in a motor vehicle as set forth in claim 1, wherein at least another side opposed to said one side of the window glass is fixed to the window frame by the clip assemblies.

* * * * *